US012682816B2

(12) United States Patent
Wu et al.

(10) Patent No.: US 12,682,816 B2
(45) Date of Patent: Jul. 14, 2026

(54) FREQUENCY-CONTROLLED CARRIER-FREE INJECTION-TYPE ACTIVE DISPLAY ARRAY DRIVING STRUCTURE

(71) Applicant: FUZHOU UNIVERSITY, Fuzhou (CN)

(72) Inventors: Chaoxing Wu, Fuzhou (CN); Shuqian Zhang, Fuzhou (CN); Yongai Zhang, Fuzhou (CN); Xiongtu Zhou, Fuzhou (CN); Yun Ye, Fuzhou (CN); Tailiang Guo, Fuzhou (CN)

(73) Assignee: FUZHOU UNIVERSITY, Fuzhou (CN)

( * ) Notice: Subject to any disclaimer, the term of this patent is extended or adjusted under 35 U.S.C. 154(b) by 0 days.

(21) Appl. No.: 19/355,143

(22) Filed: Oct. 10, 2025

(65) Prior Publication Data

US 2026/0038413 A1 Feb. 5, 2026

Related U.S. Application Data

(63) Continuation of application No. PCT/CN2024/126337, filed on Oct. 22, 2024.

(30) Foreign Application Priority Data

Nov. 17, 2023 (CN) ......................... 202311541251.6

(51) Int. Cl.
*G09G 3/20* (2006.01)
*G09G 3/32* (2016.01)

(52) U.S. Cl.
CPC ......... *G09G 3/2085* (2013.01); *G09G 3/2074* (2013.01); *G09G 3/32* (2013.01); *G09G 2300/0426* (2013.01); *G09G 2310/0202* (2013.01); *G09G 2310/0267* (2013.01); *G09G 2320/064* (2013.01); *G09G 2320/0666* (2013.01)

(58) Field of Classification Search
None
See application file for complete search history.

(56) References Cited

U.S. PATENT DOCUMENTS

2018/0182295 A1 6/2018 Ahmed

FOREIGN PATENT DOCUMENTS

CN 211319691 U 8/2020
CN 115101004 A 9/2022

(Continued)

*Primary Examiner* — Nicholas J Lee
(74) *Attorney, Agent, or Firm* — JEEN IP LAW, LLC

(57) ABSTRACT

The present invention discloses the CFI-ADA comprising: row scan lines, column scan lines, pixel regions corresponding to intersection areas of the respective row and column scan lines, and a frequency adjustable AC signal source. The pixel region is provided with row-column gating transistors and at least two CFI-LE Devices having different intrinsic driving frequencies. The row scan lines, column scan lines, and row-column gating transistors are configured to select corresponding pixel regions and apply the different frequency AC signal to the CFI-LE Devices. The CFI-LE Devices are activated at different operating frequencies according to their respective intrinsic driving frequencies when powered by the AC signal source. The present invention reduces the number of row and column scan lines under identical pixel conditions, thereby decreasing the area of the scanning circuitry and lowering the fabrication complexity of the display circuit.

10 Claims, 7 Drawing Sheets

(56) References Cited

FOREIGN PATENT DOCUMENTS

| | | | |
|---|---|---|---|
| CN | 116543690 | A | 8/2023 |
| CN | 117198209 | A | 12/2023 |
| KR | 20180025432 | A | 3/2018 |

FREQUENCY-CONTROLLED CARRIER-FREE INJECTION-TYPE ACTIVE DISPLAY ARRAY DRIVING STRUCTURE

CROSS-REFERENCE TO RELATED APPLICATIONS

This application is a continuation of International Application No. PCT/CN2024/126337, filed on Oct. 22, 2024, which claims priority to Chinese Patent Application No. 202311541251.6, filed with the China National Intellectual Property Administration on Nov. 17, 2023, both of which are hereby incorporated by reference in their entireties.

TECHNICAL FIELD

The present invention relates to the field of light emitting display driving, to a frequency-controlled carrier-free injection-type active display array driving structure.

BACKGROUND

Matrix addressing is a prevalent technique in flat panel displays, wherein pixels are selectively driven by electrical signals through row and column indices to generate target optical characteristics. Conventionally, active matrix (AM) driving is employed to achieve precise pixel control. An AM display array utilizes transistors, thin film transistors (TFTs), or other active components to regulate the electronic state of each pixel, thereby achieving enhanced control precision and response speed. These arrays are conventionally implemented in high-resolution displays, touch panels, and large format displays. With continuously increasing pixel densities, there exists a pressing need for efficient and compact driving circuitry to maximize the effective light emitting area.

Conventional display driving is typically implemented through row-column scanning driver circuits, wherein each intersection of a row scanning line and a column scanning line generally corresponds to only one light emitting device (LE Device). Thus, while a highly efficient and compact driving circuit may correspond to an increased number of row and column scanning lines, an excessive quantity of such scanning lines leads to increased circuit volume and greater structural complexity in the scanning circuitry.

SUMMARY

The present invention discloses a frequency-controlled carrier-free injection-type (CFI) active display array (ADA) driving architecture (hereinafter referred to as "CFI-ADA") that optimizes conventional display addressing by enabling multiple LE Devices to be independently controlled within a single pixel region through frequency selective alternating current (AC) driving. The structure comprises intersecting row and column scan lines that define pixel regions, each containing at least two CFI-LE Devices with distinct intrinsic driving frequencies and a gating transistor network connected to a frequency adjustable AC signal source.

At the core of this innovation lies the frequency dependent operation of CFI-LE Devices, where each device is designed to emit light only when driven by a specific AC frequency band determined. The driving architecture employs a first driving circuit that AC signals from the source to selected CFI-LE Devices when corresponding row and column lines are activated. This approach eliminates the need for complex electrode bonding and reduces the number of required scan lines by allowing multiple LE Devices to share common addressing circuitry while maintaining independent control through frequency modulation.

The CFI-LE Devices can be implemented as either single-terminal or double-terminal structures with insulating layers precisely engineered to create non-overlapping frequency response characteristics. Key insulating layer parameters including thickness, relative area, and spacing are carefully configured to ensure each LE Device responds exclusively to its designated driving frequency. The AC signal source supports various waveforms with frequencies ranging from 0 Hz to 100 GHz and voltages up to 5000 V, enabling flexible driving schemes for different display applications.

This frequency domain addressing technology significantly reduces the physical footprint of scanning circuitry compared to conventional row-column matrix architectures while maintaining precise pixel control. The invention is particularly advantageous for high resolution microdisplays and emerging applications requiring sub-micron pixel pitches, as it minimizes the area occupied by driver circuits and maximizes the effective light emitting region. Implementation options include various transistor-capacitor circuit configurations and compatibility with a broad spectrum of light emission from ultraviolet to infrared wavelengths.

By replacing spatial wiring constraints with frequency domain signal processing, the present invention offers a scalable solution to the challenges of shrinking pixel sizes in next-generation displays while simultaneously simplifying fabrication processes and reducing manufacturing costs. The architecture's inherent flexibility supports both monochrome and full-color display implementations through frequency multiplexed control of multiple light emitting elements within each pixel region.

DESCRIPTION OF EMBODIMENTS

The present invention discloses a frequency-controlled ADA driving architecture based on CFI technology. Those skilled in the field can adapt the disclosed content with appropriate technical modifications to achieve implementation. It should be expressly noted that all similar substitutions and modifications apparent to those skilled in the field are deemed to be encompassed within the scope of the present invention. The method and applications of the present invention have been described through preferred embodiments. It is evident that relevant personnel can modify, appropriately adapt, or combine the methods and applications described herein without departing from the content, spirit, and scope of the present invention, in order to implement and apply the disclosed technology.

Through our research, it has been discovered that the CFI operation mode represents an emerging driving technology specifically designed for micro/nano-pixel light emitting displays. In this mode, CFI-LE Device s feature a simplified structure and eliminate the need for complex electrode bonding. In the CFI-LE Device model, the driving electrode and light emitting element are separated by an insulating layer, enabling carrier recombination and electroluminescence through an applied AC electric field. Compared to conventional LED technology, the CFI mode eliminates issues associated with metal bonding and multiple traditional LED fabrication processes. The emergence of this technology is poised to advance display technology, offering a more efficient and streamlined approach for fabricating nanoscale light emitting displays while significantly reducing process complexity.

To address the challenge of shrinking effective light emitting areas in future sub-micron and nanoscale display pixels, optimizing the structure of the display driver array to minimize driver circuit area is of critical importance.

Figure 1:
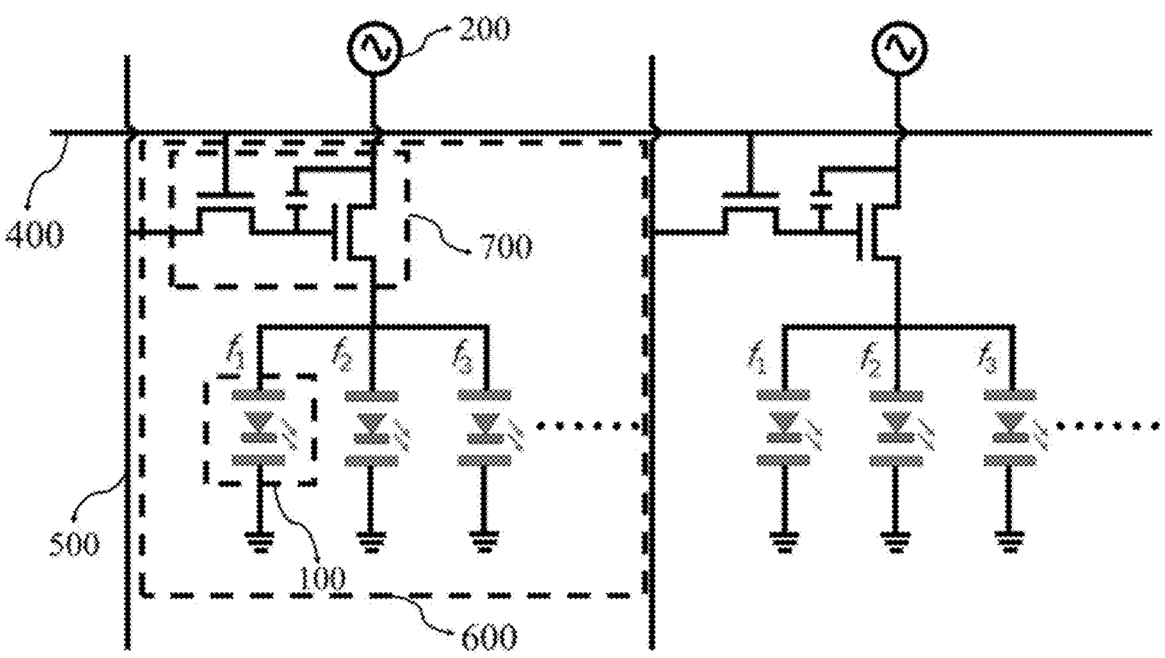
FIG. 1 shows a structural schematic diagram of a frequency-controlled CFI-ADA according to a specific embodiment of the present invention.

Therefore, an embodiment of the present invention provides a CFI-ADA, as illustrated in FIG. 1. This frequency-controlled driving structure comprises: row scan lines 400 and column scan lines 500 intersect to form pixel regions 600, each driven by an AC signal source 200 for CFI-LE Device operation. Pixel region 600 is configured with row-column gating transistors and at least two CFI-LE Devices 100 having different intrinsic driving frequencies. The row scan line 400, column scan line 500, and row-column gating transistors are used to select the corresponding pixel region 600 and connect the AC signal source 200 to the CFI-LE Device 100. CFI-LE Device 100 operates and illuminates at different frequencies of the AC signal source 200, depending on its intrinsic driving frequency characteristics. Herein, the intrinsic driving frequency refers to the frequency of the AC signal corresponding to the light emission of the CFI-LE Device 100.

In an exemplary implementation, the CFI-LE Device 100 can be configured as either a single-terminal or double-terminal CFI light emitting structure. The single-terminal CFI-LE Device comprises a light emitting element with an insulating layer disposed on one side thereof, while the double-terminal CFI-LE Device comprises a light emitting element with insulating layers disposed on both sides.

In preferred embodiments, the addressing transistors may be selected from field effect transistors (notably thin-film transistors), NPN bipolar transistors, or PNP bipolar transistors.

In one specific embodiment, the row/column selection transistors are disposed in a first drive circuit 700, wherein the first drive circuit 700 comprises three input terminals and one output terminal. Its first input connects to an AC signal source 200, the second input connects to a corresponding row scan line 400, while the third input links to an associated column scan line 500. The output terminal drives a LE Device group comprising multiple CFI-LE Devices 100. The first drive circuit 700 is configured such that when the second input terminal and the third input terminal receive corresponding activation signals, the output signal at the first output terminal matches the input signal from the first input terminal. Within the same pixel region, each CFI-LE Device 100 emits light in response to AC signals of different frequencies.

The frequency-controlled ADA with CFI architecture is configured to: in response to a light emission command for the first CFI-LE Device 100 within the LE Device group, control the corresponding row scan line 400 to output a first activation signal, the corresponding column scan line 500 to output a second activation signal, and the corresponding AC signal source 200 to output an AC signal frequency specific to the first CFI-LE Device 100. This enables the first output terminal of the first drive circuit 700 to deliver the AC signal frequency corresponding to the first CFI-LE Device 100, thereby driving its light emission.

It should be noted that the embodiments of the present invention utilize an AC driven CFI electroluminescence technology, realizing a single pixel region 600 to control multiple CFI-LE Devices 100. On one hand, this reduces the number of row scan lines 400 and column scan lines 500, thereby minimizing the area of the scanning circuitry and lowering the fabrication complexity of the display circuit. On the other hand, this approach enhances the efficiency and compactness of the drive circuitry, maximizing the effective light emitting area.

In one specific embodiment, as shown in FIG. 1, the first driving circuit 700 includes a first TFT and a TFT.

The AC signal source 200 is connected to the source of the first TFT. The drain of the first TFT is connected to the LE Device array, while its gate is connected to the drain of the second TFT. The source of the second TFT is connected to the corresponding column scan line 500, and its gate is connected to the corresponding row scan line 400. Here, the source of the first TFT serves as the first input terminal, its drain as the first output terminal, the source of the second TFT as the second input terminal, and the gate of the second TFT as the third input terminal.

The frequency-controlled CFI-ADA is configured such that, in response to a light emission command from the second CFI-LE Device 100 within the LE Device array, it controls the corresponding row scan line 400 and column scan line 500 to output high-level signals, thereby driving the drain of the second TFT to output a high-level signal. The structure controls the corresponding AC signal source 200 to output the AC signal frequency corresponding to the light emission of the second CFI-LE Device 100. This ensures that the drain of the first TFT is modulated by both the high-level signal input to its gate (which serves as an activation command) and the AC signal frequency input to its source. As a result, the first TFT outputs the AC signal frequency required for the second CFI-LE Device 100 to emit light, thereby driving the device to illuminate.

It should be noted that in FIGS. 1, f1, f2, and f3 represent the center frequencies of the respective CFI-LE Devices 100. The center frequency is defined as the midpoint of the AC signal frequency band (a range of frequencies) corresponding to light emission.

Furthermore, a first capacitor is connected between the gate and the source of the second TFT.

It should be noted that the first driving circuit 700, which employs the first TFT and the second TFT, features a simple structure while providing effective driving control. A first capacitor is connected between the gate and source of the second TFT, using its charge storage capability to ensure stable driving signals.

In one specific embodiment, the present invention generates sinusoidal driving signals with varying frequencies based on the frequency of the sinusoidal driving signal and the electro-optical characteristics of CFI-LE Device 100. By applying these sinusoidal signals to the CFI-LE Device 100, it provides the required luminous energy. Taking the driving of the CFI-LE Device 100 with a center frequency of f1 in FIG. 1 as an example, the corresponding row scan line 400 and column scan line 500 are set to a high level to activate the first driving circuit 700 in the selected pixel. A sinusoidal signal with frequency f1 is then applied from the AC signal source 200 to provide the necessary energy for light emission in the CFI-LE Device 100. The same driving method applies to the CFI-LE Devices 100 (with center frequencies f1 through fN) in the pixel region 600.

Figure 3:
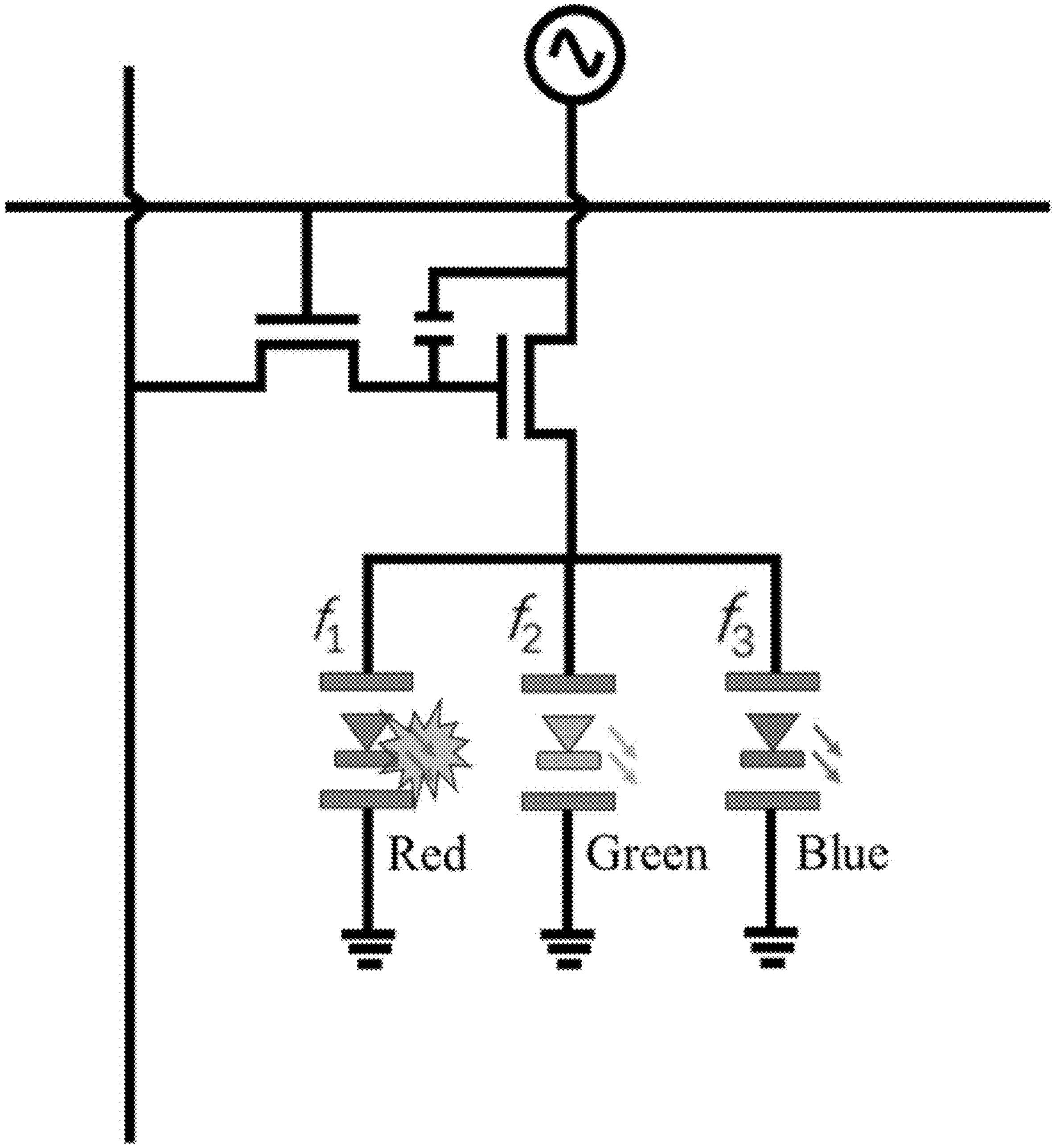
FIG. 3 is a schematic diagram illustrating the independent operation of a red CFI sub-pixel in the same pixel region achieved through frequency modulation, according to a specific embodiment of the present invention.
Figure 4:
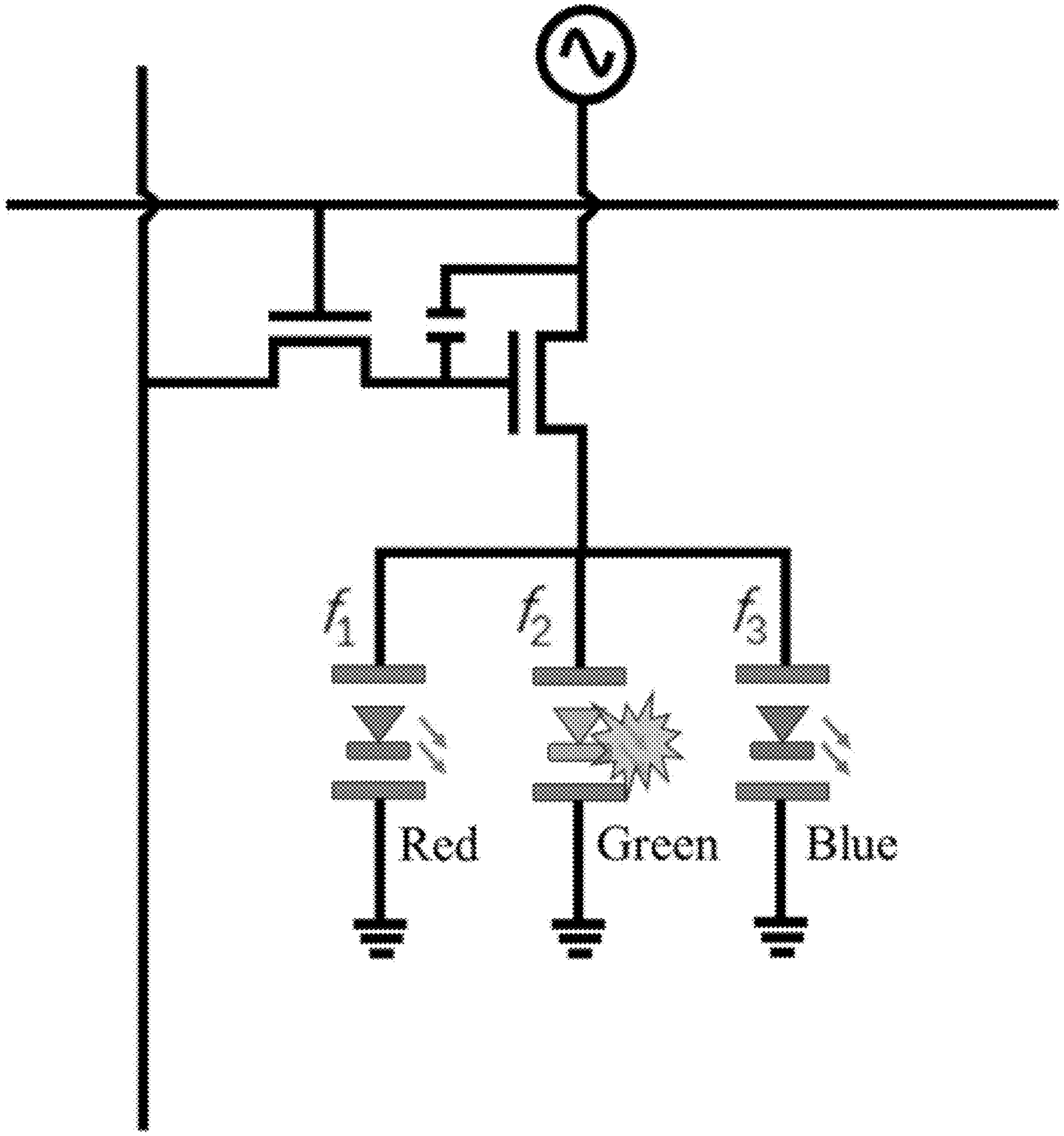
FIG. 4 is a schematic diagram illustrating the independent operation of a green CFI sub-pixel in the same pixel region achieved through frequency modulation, according to a specific embodiment of the present invention.
Figure 5:
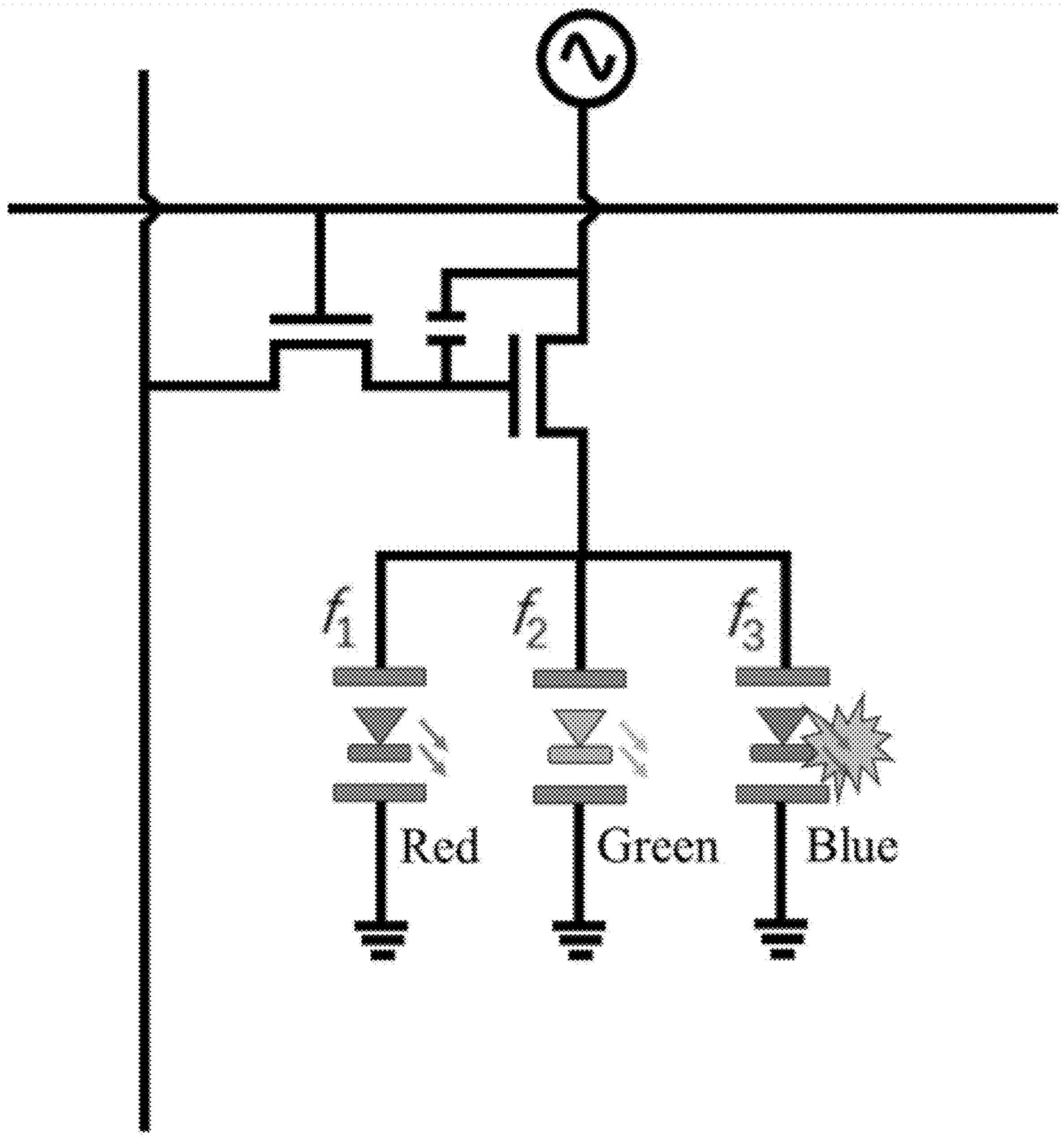
FIG. 5 is a schematic diagram illustrating the independent operation of a blue CFI sub-pixel in the same pixel region achieved through frequency modulation, according to a specific embodiment of the present invention.

In one specific embodiment, by setting the corresponding row scan line 400 and column scan line 500 of a pixel to a high level and outputting a sinusoidal signal with frequency f1 from the AC signal source 200, the red CFI-LE Device can be individually activated, as shown in FIG. 3. Similarly, when the signal source 200 outputs a sinusoidal signal with frequency f2, the green CFI-LE Device emits light independently (FIG. 4), and when the frequency is f3, the blue CFI-LE Device is controlled to emit light (FIG. 5). By adjusting the potentials of the row scan line 400 and column scan line 500, as well as the frequency of the sinusoidal signal from the AC signal source 200, different CFI-LE Devices 100 in various pixel regions 600 can be selectively activated. This enables independent control of the red, green, and blue CFI-LE Devices 100 using just a single row scan line 400 and a single column scan line 500. The frequency of the sinusoidal signal from the AC signal source 200 ranges from 0 Hz to 100 GHz. In this example, the preferred frequencies are f1=1 kHz, f2=9 kHz, and f3=100 kHz.

Figure 2:
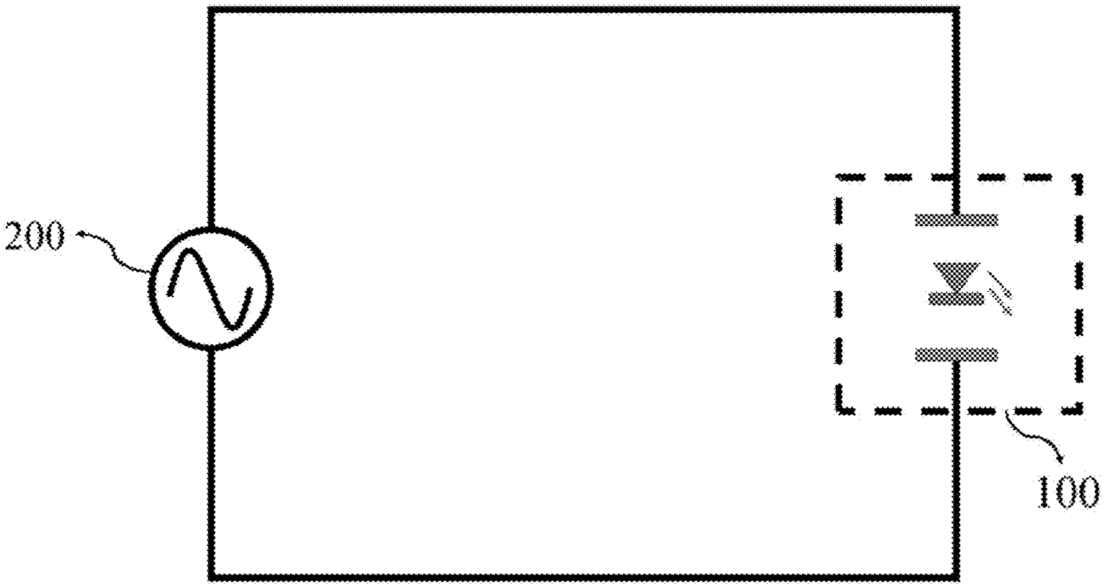
FIG. 2 is a structural schematic diagram of an AC driven CFI-LE Device according to a specific embodiment of the present invention.

In one specific embodiment, the structural schematic of the AC driven CFI-LE Device 100 can be as shown in FIG. 2.

Figure 9:
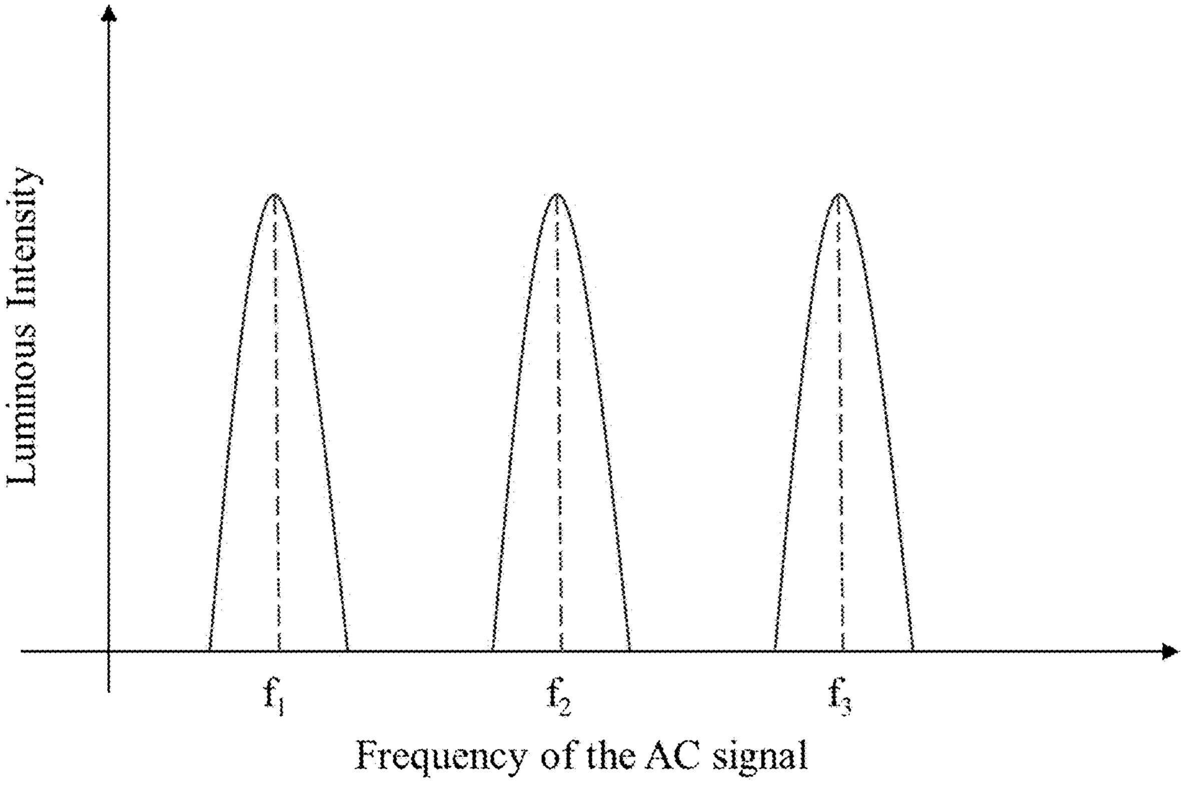
FIG. 9 is a schematic diagram illustrating the relationship between brightness and AC signal frequency for each CFI-LE Device, according to a specific embodiment of the present invention.

In one embodiment, the emission frequency characteristics of the CFI-LE Device 100 can be illustrated as shown in FIG. 9.

In one embodiment, the thickness of the insulating layer in each CFI-LE Device 100 within the same pixel region is configured according to its corresponding frequency characteristics, ensuring that the AC signal frequencies driving the emission of these devices do not interfere with each other.

In one embodiment, when the CFI-LE Device 100 is a dual-terminal CFI-LE Device, the relative area of the two insulating layers in each device 100 within the same pixel region is configured according to the corresponding frequency selective characteristics. This ensures that the AC signal frequencies driving the emission of these devices do not interfere with each other.

In one embodiment, when the CFI-LE Device 100 is a dual-terminal CFI-LE Device, the relative spacing of the two insulating layers in each device 100 within the same pixel region is configured according to the corresponding frequency selective characteristics. This ensures that the AC signal frequencies driving the emission of these devices do not interfere with each other.

It should be clarified that each CFI-LE Device 100 operates within a specific AC frequency range. For example, a red CFI-LE Device corresponds to 0.9-1.0 kHz, with its optimal illumination occurring at the center frequency of 0.95 kHz. This means the AC signal source 200 can activate the red CFI-LE Device across the entire 0.9-1.0 KHz range, while achieving maximum brightness at exactly 0.95 kHz.

The present invention is based on the principle that the operating frequency range of these CFI-LE Devices 100 is determined by three key insulating layer parameters: thickness, relative surface area, and interlayer spacing. By carefully configuring these parameters, this embodiment effectively resolves the issue of overlapping frequency ranges between CFI-LE Devices emitting different colors.

A typical overlap scenario might occur when one color CFI-LE Devices operates at 0.9-1.0 kHz while another functions at 0.95-1.05 kHz, creating an interference zone between 0.95-1.0 kHz where both devices could potentially activate. The present invention's parameter optimization methodology completely eliminates such crosstalk problems, ensuring each LE Device responds only to its designated frequency range without interference. This precise frequency isolation is achieved through systematic adjustment of the insulating layer characteristics, guaranteeing unambiguous device operation across the entire frequency range.

Optionally, the AC signal source 200 can output various waveform types including square waves, sine waves, triangular waves, pulse waves, and sawtooth waves. The output signal covers a frequency range from 0 Hz to 100 GHz with adjustable voltage peaks spanning from 0 V to 5000 V.

Figure 6:
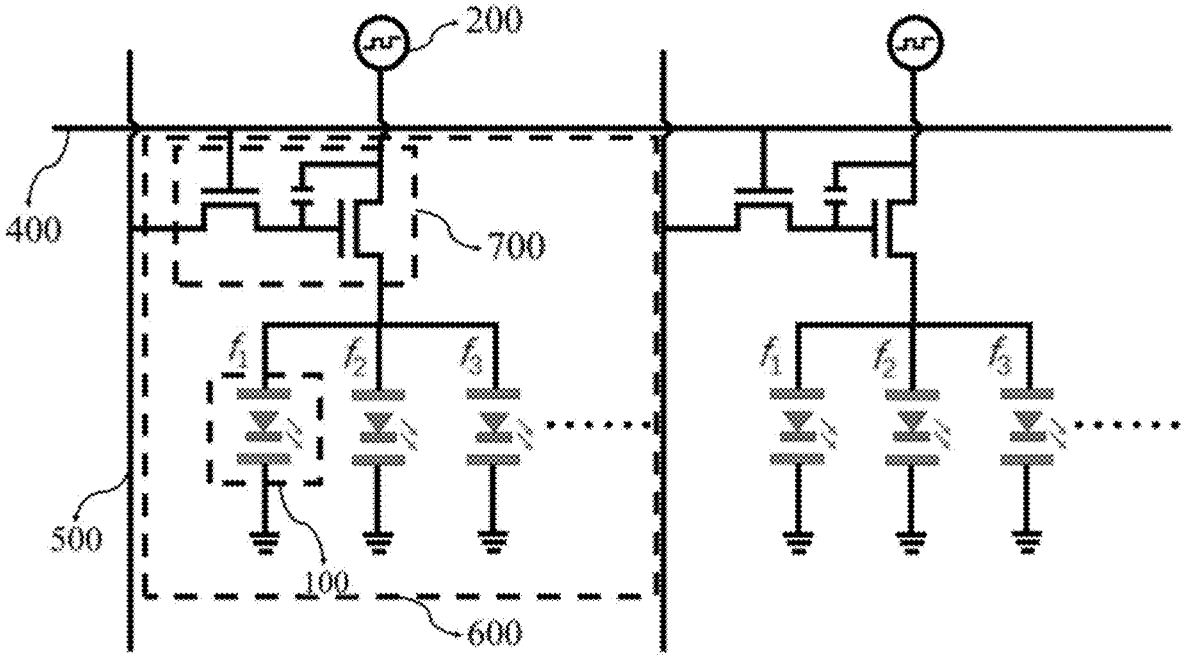
FIG. 6 is a structural schematic diagram of an ADA driving structure employing AC square wave frequency-controlled for CFI pixel operation, according to a specific embodiment of the present invention.

In one specific embodiment, as illustrated in FIG. 6, the AC signal source 200 can be configured to output various interchangeable waveform types, including square waves, triangular waves, pulse waves, sawtooth waves, and similar signal forms.

Optionally, the first driving circuit 700 can be implemented as a 2TIC circuit, 3TIC circuit, 4TIC circuit, single-transistor circuit, multi-transistor circuit, or one of the pixel embedded driving circuits.

Figure 8:
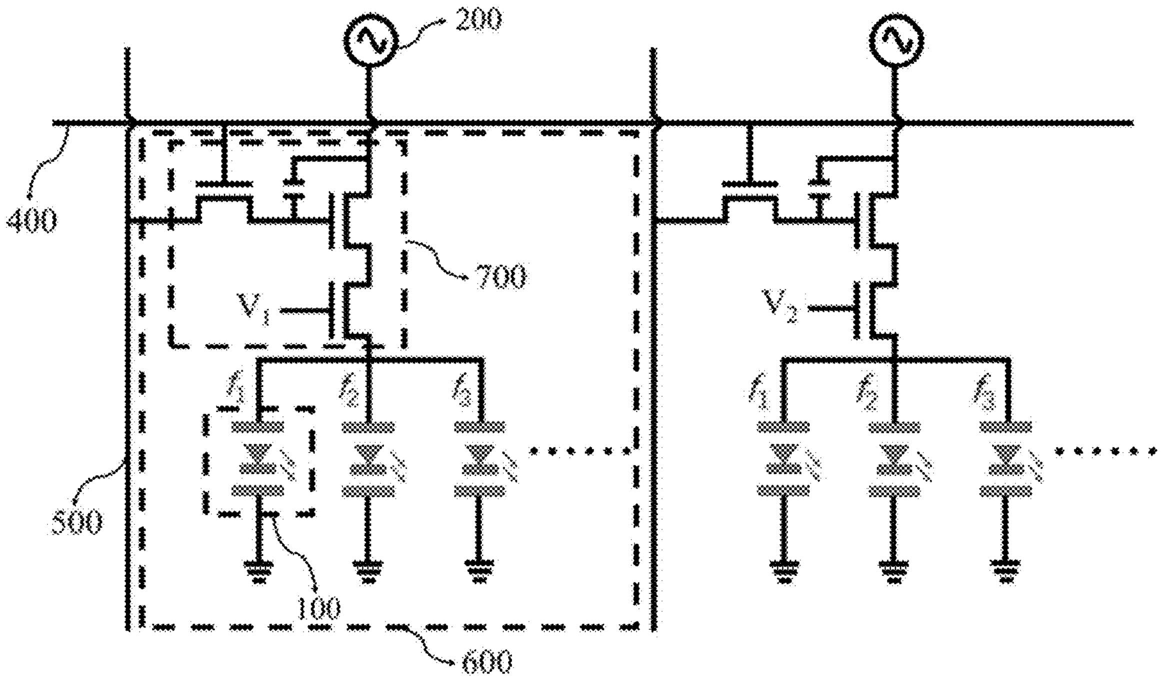
FIG. 8 is the structural diagram of the frequency-controlled CFI-ADA according to a specific embodiment of the present invention, where the first driving circuit is 3TIC.

In one specific embodiment, as illustrated in FIG. 8, the first driving circuit 700 is configured as a 3TIC circuit.

It should be noted that in the 2TIC, 3TIC, and 4T1C circuits, "T" refers to a TFT, and "C" denotes a capacitor.

Optionally, the CFI-LE Device 100 may include two-terminal CFI-LE Device, single-terminal CFI-LE Device, single-terminal CFI quantum dots LE Device (CFI-QLE Device), two-terminal CFI-QLE Device, two-terminal CFI nano-LE Device, single-terminal CFI nano-LE Device, or combinations thereof.

Figure 7:
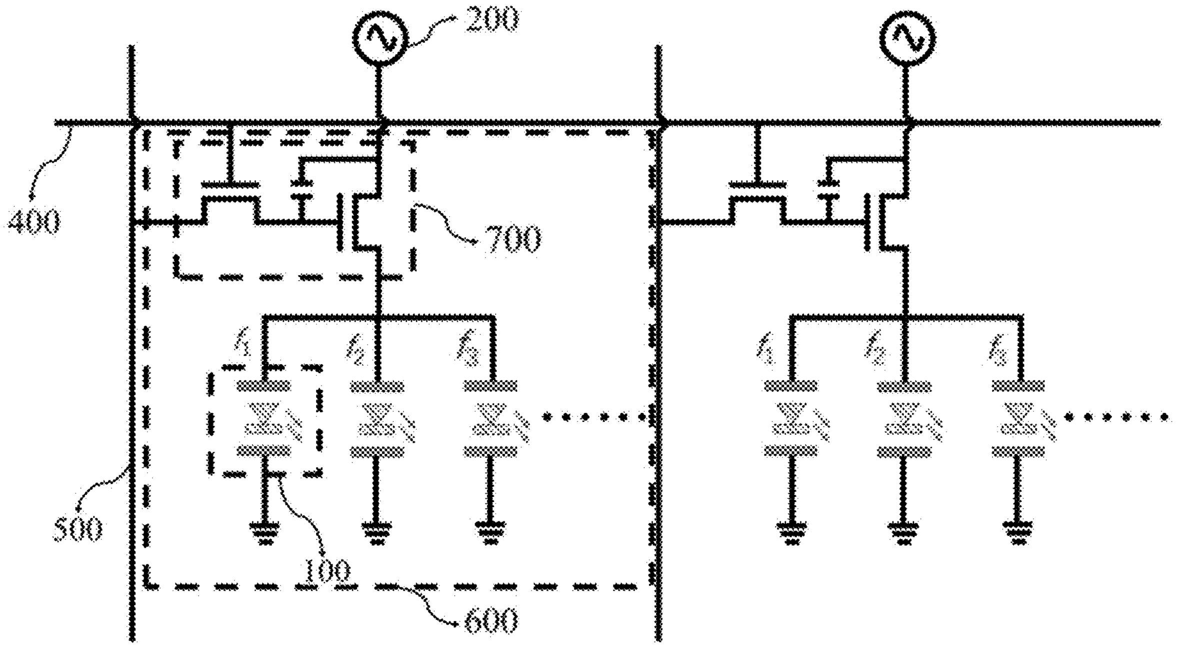
FIG. 7 is a structural schematic diagram of frequency-controlled active driving structure for another alternative CFI-LE Device, according to a specific embodiment of the present invention.

In one specific embodiment, as shown in FIG. 7, the CFI-LE Device 100 differs from that in FIG. 1 and can be of another type not illustrated in FIG. 1.

Optionally, the CFI-LE Device 100 can emit light across a broad spectral range (1 nm to 1 mm) depending on material selection, including far-ultraviolet, mid-ultraviolet, near-ultraviolet, violet, blue, cyan, green, yellow, orange, red, infrared, near-infrared, mid-infrared, and far-infrared wavelengths.

In the pixel region 600 of the present invention, the first drive circuit 700 comprises three input terminals and one output terminal. The first input terminal of the first drive circuit 700 is connected to the AC signal source 200, the second input terminal is connected to the corresponding row scan line 400, and the third input terminal is connected to the corresponding column scan line 500. The output terminal of the first drive circuit 700 is connected to a LE Device group, which includes multiple CFI-LE Devices 100. Within the same pixel region, each CFI-LE Device 100 emits light at a distinct AC signal frequency. Embodiments of the present invention employ CFI electroluminescence technology driven by an AC signal. Within a single pixel region 600 (typically corresponding to the intersection of one row scan line 400 and one column scan line 500), multiple CFI-LE Devices 100 can be configured, each operating at a different AC signal frequency. These devices 100 emit light when driven by corresponding AC signal frequencies applied via the AC signal source 200. Compared to conventional technologies where a single pixel region 600 typically corresponds to only one LE Device, embodiments of the present invention enable a single pixel region 600 to integrate multiple CFI-LE Devices 100. Under the same pixel emission conditions, this reduces the number of row scan lines 400 and column scan lines 500 required, thereby shrinking the scan circuit area and lowering the fabrication complexity of the display circuitry.

Embodiments of the present invention enable independent frequency control of multiple CFI-LE Devices 100 within the same pixel region by configuring the thickness of the insulating layer, the relative area of the insulating layer, and the relative spacing between insulating layers. This ensures that the AC signal frequencies required to activate each LE Device 100 do not interfere with each other.

In summary, embodiments of the present invention provide a frequency-controlled ADA driving technology based on CFI-LE Devices. This technology uses the frequency dependent electro-optical characteristics of CFI-LE Devices 100, enabling selective activation of different devices 100 by applying AC signals at distinct frequencies. In this driving circuit, the array pixel region 600 is formed by the vertical intersection of row scan lines 400 and column scan lines 500. Each pixel region 600 includes multiple CFI-LE Devices 100 with different driving frequencies and their associated pixel circuits. This frequency modulation technology employs frequency switching, enabling the selective addressing and brightness control of the CFI-LE Devices 100 solely through frequency modulation. Compared to conventional row-column scanning drive circuits, this technology significantly reduces the number of required row scan lines 400 and column scan lines 500 under equivalent pixel conditions, thereby minimizing the footprint of the scanning circuitry. By simplifying the display circuit architecture, it lowers fabrication complexity and cost, offering a more economical and efficient solution for high-resolution displays. On the other hand, in the embodiments of the present invention, the parameter configuration of the insulating layer ensures that the AC signal frequencies corresponding to the light emission of the respective CFI-LE Devices 100 within the same pixel region do not interfere with each other.

It should be noted that, in this document, relational terms such as "first" and "second" are used solely to distinguish one entity or operation from another, without necessarily requiring or implying any actual relationship, sequence, or order between them. Furthermore, the term "comprising" (or "including," "containing," or any variation) is intended to denote a non-exclusive inclusion, such that a process, method, product, or apparatus comprising a list of elements not only includes those elements but may also encompass other elements not explicitly listed or inherent to such process, method, product, or apparatus. Unless otherwise specified, an element defined by the phrase "comprising a . . . " does not preclude the presence of additional identical elements in the process, method, product, or apparatus that includes said element.

The embodiments in this specification are described in a related manner. For identical or similar parts between different embodiments, cross-reference may be made accordingly. Each embodiment primarily focuses on the differences from other embodiments. In particular, for system embodiments, since they are largely similar to method embodiments, the description is relatively concise, and relevant details can be referred to in the corresponding method embodiments.

The foregoing embodiments are merely illustrative of preferred implementations of the present invention and shall not be construed as limiting the scope. All modifications, equivalent substitutions, and improvements made within the spirit and essential principles of the present invention shall be deemed to fall within the protection scope of the present invention.

What is claimed is:

1. A frequency-controlled carrier-free injection-type active display array (CFI-ADA) driving structure, wherein the frequency-controlled driving structure comprises: row scanning lines, column scanning lines, pixel regions corresponding to intersections of the row and column scanning lines, and an AC signal source;

each pixel region includes a row-column gating transistor and at least two carrier-free injection-type light-emitting (CFI-LE) devices with distinct intrinsic driving frequencies, the row scanning lines, column scanning lines, and row-column gating transistor are configured to selectively activate a corresponding pixel region and apply the frequency adjustable AC signal to the CFI-LE devices, the CFI-LE devices are configured to illuminate when driven by corresponding frequency components of the AC signal source, with each device activating at its respective intrinsic driving frequency.

2. The driving structure according to claim 1, wherein the CFI-LE devices are single-terminal or double-terminal CFI-LE devices, the single-terminal CFI-LE devices comprising a light-emitting element with an insulating layer disposed on one side thereof, and the double-terminal CFI-LE devices comprising a light-emitting element with insulating layers disposed on both sides.

3. The driving structure according to claim 1, wherein the row-column gating transistor is configured in a first driving circuit, the first driving circuit comprises three input terminals and one output terminal, a first input terminal of the first driving circuit is connected to the AC signal source, a second input terminal of the first driving circuit is connected to a corresponding row scanning line, a third input terminal of the first driving circuit is connected to a corresponding column scanning line, and a first output terminal of the first driving circuit is connected to a light-emitting (LE) device group comprising a plurality of CFI-LE devices;

the first driving circuit is configured such that when corresponding activation signals are applied to the second input terminal and the third input terminal, an output signal at the first output terminal matches an input signal at the first input terminal;

within the same pixel region, each CFI-LE device operates at a distinct AC signal frequency for illumination, a frequency-controlled CFI-ADA is configured to, in response to a light emission command for a first CFI-LE device within the LE device group, control the corresponding row scanning line to output a first activation signal, the corresponding column scanning line to output a second activation signal, and the corresponding AC signal source to output an AC signal frequency corresponding to the first CFI-LE device, thereby causing the first output terminal of the first driving circuit to output the AC signal frequency to drive the first CFI-LE device to emit light.

4. The driving structure according to claim 3, wherein the first driving circuit comprises a first thin-film transistor (TFT) and a second TFT, the AC signal source is connected to a source electrode of the first TFT, a drain electrode of the first TFT is connected to the LE device group, and a gate electrode of the first TFT is connected to a drain electrode of the second TFT, a source electrode of the second TFT is connected to a corresponding column scanning line, and a gate electrode of the second TFT is connected to a corresponding row scanning line;

the frequency-controlled CFI-ADA is configured to, in response to a light emission command for a second CFI-LE device within the LE device group, control the corresponding row scanning line and column scanning line associated with the LE device group to output high-level signals, thereby causing the drain electrode of the second TFT to output a high-level signal;

the driving structure is further configured to control the corresponding AC signal source to output the AC signal frequency corresponding to a light emission of the second CFI-LE device, such that the drain electrode of the first TFT is controlled by both the high-level signal input to the gate electrode of the first TFT and the AC signal frequency input to the source electrode of the first TFT, thereby outputting the AC signal frequency corresponding to the light emission of the second CFI-LE device and further driving the second CFI-LE device to emit light.

5. The driving structure according to claim 4, wherein a first capacitor is connected between the gate electrode and the source electrode of the second TFT.

6. The driving structure according to claim 1, wherein the insulating layer in each CFI-LE device within the same pixel region is configured according to its corresponding frequency characteristics, ensuring that AC signal frequencies driving the emission of these devices do not interfere with each other.

7. The driving structure according to claim 1, wherein the CFI-LE devices are dual-terminal CFI-LE devices, a relative area of two insulating layers in each device within the same pixel region is configured according to corresponding frequency selective characteristics to ensure that AC signal frequencies driving the emission of these devices do not interfere with each other.

8. The driving structure according to claim 1, wherein the CFI-LE devices are dual-terminal CFI-LE devices, a relative spacing of the two insulating layers in each device within the same pixel region is configured according to corresponding frequency selective characteristics to ensure that AC signal frequencies driving the emission of these devices do not interfere with each other.

9. The driving structure according to claim 1, wherein the AC signal source outputs AC signals comprising square wave signals, sine wave signals, triangular wave signals, pulse wave signals, and sawtooth wave signals, with a frequency range of 0 Hz to 100 GHz and a peak voltage of 0 V to 5000 V.

10. The driving structure according to claim 1, wherein the first driving circuit adopts one of the following configurations: a 2T1C circuit, a 3T1C circuit, a 4T1C circuit, a single-transistor circuit, a multi-transistor circuit, or one of pixel embedded driving circuits.

* * * * *